United States Patent
Romenesko et al.

(10) Patent No.: US 7,466,088 B2
(45) Date of Patent: Dec. 16, 2008

(54) SIGNAL CONTROL FOR MOTOR POSITION DETERMINATION

(75) Inventors: Charles J. Romenesko, Roscoe, IL (US); Vijay Maddali, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 369 days.

(21) Appl. No.: 11/305,684

(22) Filed: Dec. 16, 2005

(65) Prior Publication Data

US 2007/0138880 A1    Jun. 21, 2007

(51) Int. Cl.
*H02P 1/18* (2006.01)

(52) U.S. Cl. .................. 318/254.1; 318/139; 318/807

(58) Field of Classification Search ............... 318/254, 318/138, 696, 690, 691, 43, 254.1, 139, 807
See application file for complete search history.

(56) References Cited

U.S. PATENT DOCUMENTS

| | | | | |
|---|---|---|---|---|
| 5,565,752 A | * | 10/1996 | Jansen et al. | 318/807 |
| 5,585,709 A | * | 12/1996 | Jansen et al. | 318/807 |
| 6,583,593 B2 | * | 6/2003 | Iijima et al. | 318/400.32 |
| 7,045,988 B2 | * | 5/2006 | Ha et al. | 318/807 |
| 7,064,504 B2 | * | 6/2006 | Imai et al. | 318/400.04 |
| 2006/0001392 A1 | * | 1/2006 | Ajima et al. | 318/432 |

* cited by examiner

*Primary Examiner*—Bentsu Ro
*Assistant Examiner*—Thai Dinh
(74) *Attorney, Agent, or Firm*—Carlson, Gaskey & Olds PC

(57) ABSTRACT

A controller estimates a motor position. The controller includes a driver and an injector. The driver generates a fundamental control signal. The injector generates a position carrier voltage that superimposed on the fundamental control signal. The injector alters the magnitude of the carrier voltage signal in response to the corresponding amplitude of the fundamental control signal. In a disclosed example, the injector increases the carrier voltage signal magnitude as the fundamental control current signal approaches a zero crossing. The injector then gradually decreases the carrier voltage signal magnitude as the fundamental control current signal magnitude increases from zero.

13 Claims, 2 Drawing Sheets

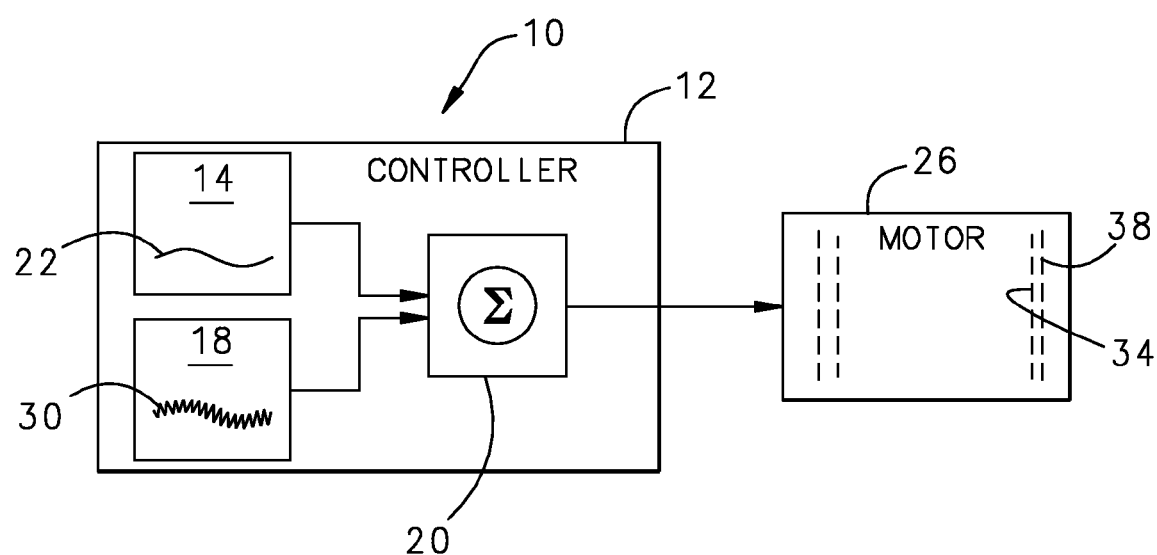
F I G . 1

SIGNAL CONTROL FOR MOTOR POSITION DETERMINATION

BACKGROUND OF THE INVENTION

This invention generally relates to motor control. More specifically, this invention relates to a method of estimating position information for a motor.

Electric motors typically are controlled to provide a desired performance. Position information regarding motor components is necessary to achieve accurate control. Various position determination techniques have been proposed.

One known technique of estimating motor component position involves superimposing a carrier voltage signal upon a fundamental control voltage signal and using a resulting carrier current signal from the motor to estimate a position of the rotor. A controller generates the fundamental control signal, which drives the motor rotor to produce rotational torque. The controller generates and superimposes the carrier voltage signal upon the fundamental control voltage signal in an open-loop fashion. The controller generates the carrier voltage signal at a consistent strength and at a relatively higher frequency than the fundamental control signal.

As the carrier voltage signal is a relatively high-frequency signal, the carrier voltage signal does not substantially affect the fundamental control signal driving the motor. This technique for estimating the angular position of the motor rotor is described in U.S. Pat. No. 5,585,709.

That technique has proven useful but it has shortcomings. For example, the open loop approach does not allow for feedback to correct or compensate for inverter non-linearities. It follows that portions of the carrier voltage signal are not useful for providing accurate measurements of the rotor position.

There is a need for an improved technique that takes advantage of known control strategies yet provides more reliable position information. This invention addresses that need.

SUMMARY OF THE INVENTION

An exemplary controller includes a driver and an injector. The driver generates a fundamental control signal. The injector superimposes a carrier voltage signal upon the fundamental control signal and alters the amplitude of the position indicator signal in response to the amplitude of the fundamental control signal.

An exemplary method of controlling a carrier voltage signal includes generating a fundamental control signal and superimposing the carrier voltage signal over the fundamental control signal. The position indicator signal is selectively altered based upon the amplitude of the fundamental control signal.

These and other features of the present invention can be understood from the following specification and drawings, the following of which is a brief description.

BRIEF DESCRIPTION OF THE DRAWINGS

FIG. 1 schematically illustrates an example motor control system.

DETAILED DESCRIPTION OF THE PREFERRED EMBODIMENT

Figure 2:
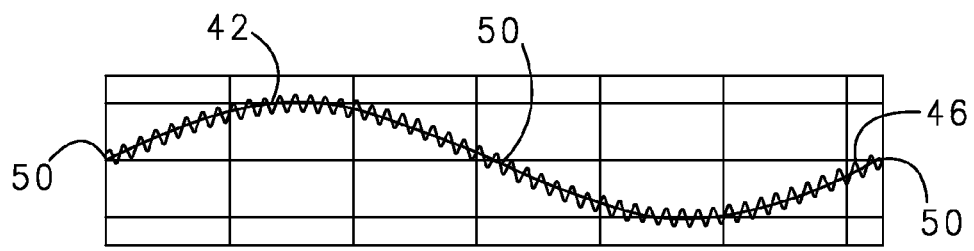
FIG. 2 is a graphical representation of a prior art carrier voltage signal superimposed upon a fundamental control signal.

FIG. 1 schematically illustrates an example carrier magnitude modulation motor control system 10 including a controller 12 comprising a driver 14, an injector 18 and a summer 20. The driver 14 generates a fundamental control signal 22 having current and voltage components, which drives a motor 26. The injector 18 generates a carrier voltage signal 30. The summer 20 superimposes the carrier voltage signal 30 onto the fundamental control signal 22. In one example, the carrier voltage signal 30 is a function of the fundamental control signal 22.

One example motor 26 is a salient AC motor having a rotor 34 and a stator 38. In response to the carrier voltage signal 30, saliencies within the rotor 34 affect the impedance detected at the stator 38 and a resulting carrier current signal that can be detected in a known manner. The fluctuating impedance represents an instantaneous rotational position of the rotor 34 in a known manner. The teachings of U.S. Pat. No. 5,585,709 are incorporated into this description by reference as an example detection technique.

The frequency of the carrier voltage signal 30 is substantially higher than the frequency of the fundamental control signal 22. Accordingly, the carrier voltage signal 30 does not substantially affect the motor control. In one example, the fundamental control signal 22 has a frequency of approximately 1 Hz while the frequency of the carrier voltage signal 30 is approximately 500 Hz. In some examples, other frequencies that are substantially higher than the motor's electrical speed of operation are useful. Persons skilled in the art who have the benefit of this description will be able to select other suitable combinations of frequencies to meet their particular needs.

Referring now to the prior art of FIG. 2, the amplitude of a prior art fundamental control current signal 42 varies as the fundamental control current signal 42 sinusoidally oscillates. Relative to the fundamental control current signal 42, a prior art position indicator signal 46 has a consistent peak amplitude as shown. However, when the fundamental control current signal 42 is near a zero crossing 50, the magnitude of the actual inverter voltage of an inverter in the motor control diminishes such that motor output carrier current corresponding to the carrier voltage signal 46 cannot indicate the rotational position of the rotor 34 near the zero crossings 50. This is due, at least in part, to non-linearities of inverters used in the motor controller.

The disclosed example includes the realization that the carrier voltage signal 46 is not constant through the zero crossings 50 of the fundamental control current signal 42. One example includes strategically altering at least the amplitude of the carrier voltage command signal 30 to compensate for such times.

Figure 3:
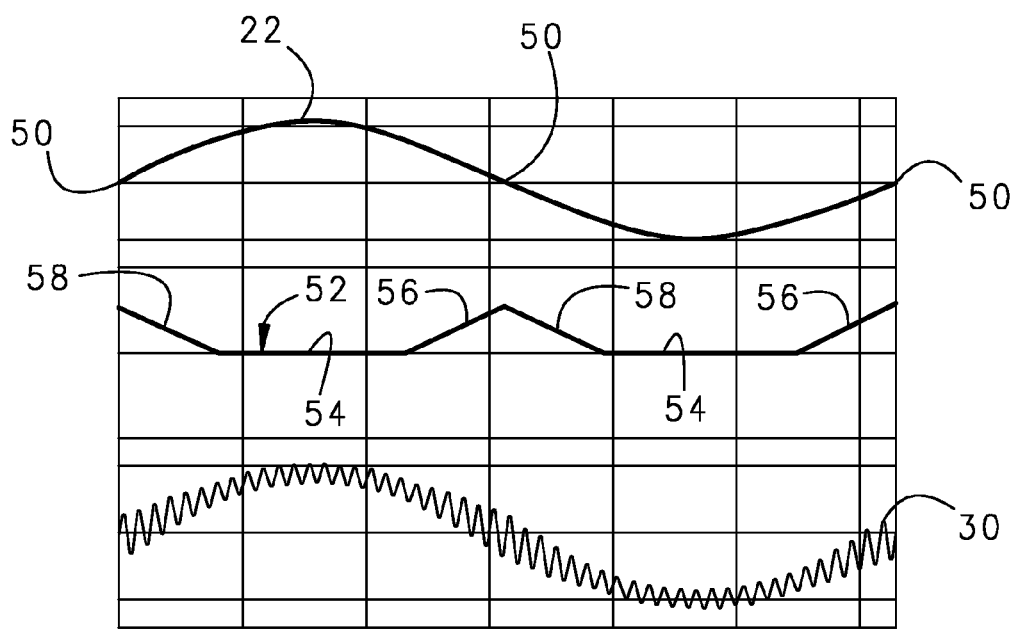
FIG. 3 is a graphical representation of an example carrier voltage signal alteration strategy according to one embodiment.

FIG. 3 shows one example approach for altering the carrier voltage command signal 30. In this example, a magnitude control pattern 52 varies depending on the magnitude of the fundamental control current signal 22. The pattern 52 has a nominal value in the regions 54, which correspond to portions of the fundamental control current signal 22 passing though peak magnitude regions. As the fundamental control current signal 22 approaches a zero crossing 50, the magnitude control pattern 52 increases as shown at 56. In one example, the magnitude control pattern 52 increases 25% from the nominal value in the regions 54. The carrier voltage command signal 30 has a correspondingly increasing magnitude as can be appreciated from the drawing.

As the fundamental control current signal 22 moves away from the zero crossing 50, the magnitude control pattern 52 decreases at 58. In this manner, the injector 18 gradually decreases the magnitude of the carrier voltage command signal 30 until it returns the nominal value.

A linear alteration is used in this example. Other examples include a stepped magnitude control signal or a curvilinear progression for changing the magnitude of the carrier voltage signal 30. Given this description, those skilled in the art will be able to select an alteration pattern that meets their particular needs.

Figure 4:
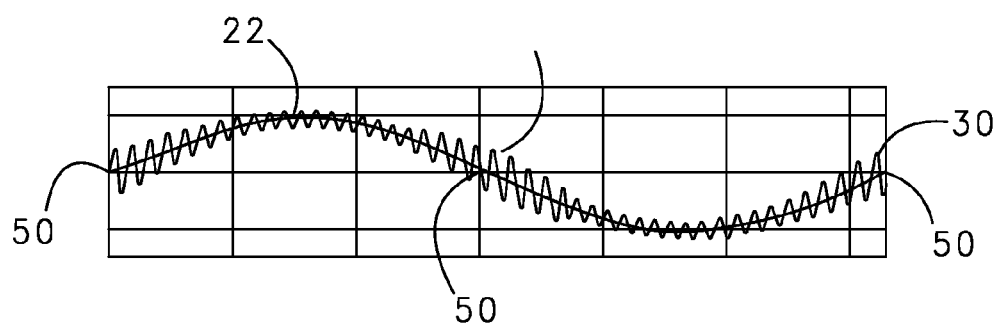
FIG. 4 is a graphical representation of an example carrier voltage signal superimposed upon a fundamental control signal in one example embodiment.

As shown in FIG. 4, the amplitude of the carrier voltage signal 30 increases substantially in areas corresponding to the zero crossings 50 of the fundamental control current signal 22. The selectively altered carrier voltage signal 30 thereby compensates for inaccuracies introduced by inverter non-linearities near the zero crossings 50. By modulating the carrier voltage command signal 30 (i.e., a voltage command to the inverter) based on the magnitude of the fundamental control current signal 22. The inverter is effectively commanded to produce a constant carrier injection voltage magnitude that produces a more reliable position indication for the rotor 34.

In this example, the alterations occur over a time providing a window on either side of the zero crossings 50. In this example, the magnitude of the carrier voltage signal 30 varies within each window and is greatest at a time corresponding to the actual zero crossing 50 of the fundamental control current signal 22.

In one example, the injector 18 monitors the fundamental control current signal 22 to identify the times when the carrier voltage signal 30 should be altered according to a preselected pattern.

The example system 10 generates substantial improvements in the reliability of the measurements of the rotor 34 position even when the fundamental control current signal 22 is near the zero crossings 50.

Although a preferred embodiment of this invention has been disclosed, a worker of ordinary skill in this art might recognize that certain modifications are possible that come within the scope of this invention. For that reason, the following claims should be studied to determine the true scope of protection given for this invention.

We claim:

1. A controller comprising:
   a driver that generates a fundamental control signal that has a varying amplitude; and
   an injector that provides a carrier voltage signal that is superimposed upon said fundamental control signal and alters an amplitude of said carrier voltage signal responsive to the amplitude of said fundamental control signal, wherein said injector increases the amplitude of said carrier voltage signal when said fundamental control signal amplitude is zero.

2. The controller of claim 1, wherein a peak amplitude of said carrier voltage signal corresponds to the zero amplitude of said fundamental control signal.

3. The controller of claim 1, wherein the amplitude of said carrier voltage signal is zero at an absolute value of said fundamental control signal.

4. A controller comprising:
   a driver that generates a fundamental control signal that has a varying amplitude; and
   an injector that provides a carrier voltage signal that is superimposed upon said fundamental control signal and alters an amplitude of said carrier voltage signal responsive to the amplitude of said fundamental control signal, wherein said injector gradually increases the amplitude of said carrier voltage signal as the amplitude of said fundamental control signal approaches zero.

5. The controller of claim 4, wherein said injector linearly increases the amplitude of said carrier voltage signal as the amplitude of said fundamental control signal approaches zero.

6. A controller comprising:
   a driver that generates a fundamental control signal that has a varying amplitude; and
   an injector that provides a carrier voltage signal that is superimposed upon said fundamental control signal and alters an amplitude of said carrier voltage signal responsive to the amplitude of said fundamental control signal, wherein said injector gradually decreases the amplitude of said carrier voltage signal as the amplitude of said fundamental control signal increases from zero.

7. The controller of claim 6, wherein said injector linearly decreases the amplitude of said carrier voltage signal as the amplitude of said fundamental control signal increases from zero.

8. A controller comprising:
   a driver that generates a fundamental control signal that has a varying amplitude; and an injector that provides a carrier voltage signal that is superimposed upon said fundamental control signal and alters an amplitude of said carrier voltage signal responsive to the amplitude of said fundamental control signal, wherein said fundamental control signal drives a motor having a rotor and a stator, wherein said carrier voltage signal instigates a responsive carrier current signal from the motor that provides an indication of a position of said rotor.

9. A method of controlling a signal used for indicating a position comprising:
   generating a fundamental control signal;
   superimposing a carrier voltage signal over said fundamental control signal;
   selectively altering said carrier voltage signal depending on an amplitude of said fundamental control signal; and
   increasing said carrier voltage signal when the amplitude of said fundamental control signal is about zero.

10. The method as recited in claim 9, including gradually increasing said carrier voltage signal as said fundamental control signal approaches zero.

11. The method as recited in claim 9, including linearly increasing said carrier voltage signal as said fundamental control signal approaches zero.

12. A method of controlling a signal used for indicating a position comprising:
   generating a fundamental control signal;
   superimposing a carrier voltage signal over said fundamental control signal;
   selectively altering said carrier voltage signal depending on an amplitude of said fundamental control signal; and
   including gradually decreasing said carrier voltage signal as said fundamental control signal increases from zero.

13. The method as recited in claim 12, including linearly decreasing said carrier voltage signal as said fundamental control signal increases from zero.

* * * * *